United States Patent
Lin et al.

(10) Patent No.: US 8,935,084 B2
(45) Date of Patent: Jan. 13, 2015

(54) VEHICLE EMISSION MONITORING DEVICE AND METHOD THEREOF

(75) Inventors: Ke-Wei Lin, Changhua County (TW); Shih-Chang Chen, Changhua County (TW); Yu-Chi Shiue, Changhua County (TW); Chih-Wei Chuang, Changhua County (TW)

(73) Assignee: Automotive Research & Test Center, Changhua County (TW)

( * ) Notice: Subject to any disclaimer, the term of this patent is extended or adjusted under 35 U.S.C. 154(b) by 120 days.

(21) Appl. No.: 12/980,957

(22) Filed: Dec. 29, 2010

(65) Prior Publication Data

US 2012/0173132 A1    Jul. 5, 2012

(51) Int. Cl.
*F01N 11/00*    (2006.01)
*G06F 19/00*    (2011.01)

(52) U.S. Cl.
CPC ............. *F01N 11/00* (2013.01); *F01N 2560/00* (2013.01); *F01N 2900/08* (2013.01); *Y02T 10/47* (2013.01)
USPC ........................................ 701/123; 701/109

(58) Field of Classification Search
USPC ........... 701/123, 33.4, 102; 702/24; 73/23.31, 73/114.76
See application file for complete search history.

(56) References Cited

U.S. PATENT DOCUMENTS

| | | | | |
|---|---|---|---|---|
| 3,906,437 A | * | 9/1975 | Brandwein et al. | 340/945 |
| 7,668,643 B2 | | 2/2010 | Peng et al. | |
| 2006/0218988 A1 | * | 10/2006 | Nakamura | 73/23.31 |
| 2009/0125180 A1 | * | 5/2009 | Berkobin et al. | 701/35 |

FOREIGN PATENT DOCUMENTS

| | | | |
|---|---|---|---|
| CN | 100456012 C | | 1/2009 |
| GB | 2469122 | * | 6/2010 |
| TW | M366728 U | | 10/2009 |
| TW | I342357 B | | 5/2011 |

* cited by examiner

*Primary Examiner* — Helal A Algahaim
*Assistant Examiner* — Charles J Han
(74) *Attorney, Agent, or Firm* — Rosenberg, Klein & Lee

(57) ABSTRACT

The present invention discloses a vehicle emission monitoring device and a method thereof. The method of the present invention comprises steps: obtaining an OBS instantaneous fuel consumption and a carbon dioxide emission from an on-board emission measurement system (OBS); working out an OBS fuel consumption-carbon dioxide emission relationship with a statistical method or a regression method; obtaining an OBD instantaneous fuel consumption from an on-board diagnostic (OBD) system; establishing an OBS-OBD fuel consumption relationship; and converting the OBD instantaneous fuel consumption into an carbon dioxide emission according to the OBS-OBD fuel consumption relationship and the OBS fuel consumption-carbon dioxide emission relationship.

10 Claims, 6 Drawing Sheets

VEHICLE EMISSION MONITORING DEVICE AND METHOD THEREOF

BACKGROUND OF THE INVENTION

1. Field of the Invention

The present invention relates to a carbon dioxide emission monitoring device and a method thereof, particularly to a device and method, which use on-board diagnostic system to obtain instantaneous fuel consumption and work out carbon dioxide emission.

2. Description of the Related Art

Application of fossil fuels generates massive greenhouse gases and causes global warming. Therefore, people pay much attention to carbon dioxide emission and invent various systems to detect it. Among them, OBS (On-Board Emission Measurement System) is the most frequently used. The OBS system detects carbon dioxide with a heated non-dispersive infrared analyzer, which is based on the principle that a specified gas absorbs a specified wavelength of light. Then, the volume concentration of carbon dioxide is converted into carbon dioxide emission. However, OBS is too expensive to install in every vehicle. If OBS systems are arranged at some specified sites to detect carbon dioxide emission, it is time-consuming and hard to obtain instantaneous emission information. Besides, OBS is too complicated to install and operate on streets.

A Taiwan patent No. 097110938 disclosed a technology that uses an on-board diagnostic (OBD) system to obtain vehicle information and uses a wireless network to transmit the information to a far-end server for diagnosing waste gas emission. However, the OBD system can only roughly estimate waste gas emission from the instantaneous fuel consumption. Therefore, the correctness and usefulness of the information obtained thereby is limited.

A China patent No. 200710055470.8 disclosed a technology that uses a manifold pressure sensor, a manifold temperature sensor and a waste gas analyzer to detect fuel consumption and exhaust of a vehicle. The prior art can indeed detect fuel consumption and exhaust of a vehicle. However, the system and the calculation process thereof are too complicated.

A Taiwan patent No. M366728 disclosed a technology that uses GPS to detect displacement of a vehicle and uses the displacement to calculate the carbon dioxide emission caused by the displacement. However, accuracy of the data obtained thereby is uncertain because GPS has an intrinsic error.

Accordingly, the present invention proposes a vehicle emission monitoring device, which is a simple and easy-to-operate value-added instrument for an OBD system, and a method thereof, to monitor carbon dioxide emission and solve the conventional problems.

SUMMARY OF THE INVENTION

The primary objective of the present invention is to provide a carbon dioxide emission monitoring device, which is a simple value-added instrument for an OBD system, and which obtains instantaneous fuel consumption from a vehicle and works out carbon dioxide emission of the vehicle, and which is easy to install and operate and adaptive to any vehicle having an OBD system, whereby carbon dioxide emission is instantaneously obtained, and whereby the cost of detecting carbon dioxide emission is reduced.

Another objective of the present invention is to provide a carbon dioxide emission monitoring method, which obtains carbon dioxide emission and OBS instantaneous fuel consumption from an OBS system and obtains OBD instantaneous fuel consumption from an OBD system, and which works out an OBS fuel consumption-carbon dioxide emission relationship and an OBD-OBS fuel consumption relationship, and which stores the two relationships in a memory, whereby the carbon dioxide emission detection process is exempted from using an OBS system to detect carbon dioxide exhaust.

To achieve the abovementioned objectives, the present invention proposes a vehicle emission monitoring device, which comprises an OBD connector, a storage unit and a computation unit, wherein the computation unit obtains OBD instantaneous fuel consumption from an OBD system via the OBD connector, uses an OBD-OBS fuel consumption relationship stored in the storage unit to work out a calibrated value, and then uses an OBS fuel consumption-carbon dioxide emission relationship stored in the storage unit to convert the calibrated value into carbon dioxide emission.

To achieve the abovementioned objectives, the present invention proposes a vehicle emission monitoring method, which uses an OBS system to obtain OBS instantaneous fuel consumption and carbon dioxide emission and works out an OBS fuel consumption-carbon dioxide emission relationship, and which establishes an OBD-OBS fuel consumption relationship with OBS instantaneous fuel consumption being the dependent variable, and which converts the OBD instantaneous fuel consumption obtained from an OBD system into carbon dioxide emission according to the OBD-OBS fuel consumption relationship and the OBS fuel consumption-carbon dioxide emission relationship.

Below, the embodiments are described in detail to make easily understood the objectives, technical contents, characteristics and accomplishments of the present invention.

DETAILED DESCRIPTION OF THE INVENTION

The present invention uses an OBD (On-Board Diagnostic) system to obtain OBD instantaneous fuel consumption of a vehicle and uses the OBD instantaneous fuel consumption to work out carbon dioxide emission of the vehicle. Firstly, use an OBS system to obtain OBS instantaneous fuel consumption and carbon dioxide emission, and establish an OBS fuel consumption-carbon dioxide emission relationship. Next, use an OBD system to obtain OBD instantaneous fuel consumption, and establish an OBD-OBS fuel consumption relationship with OBS instantaneous fuel consumption being the dependent variable.

Figure 1:
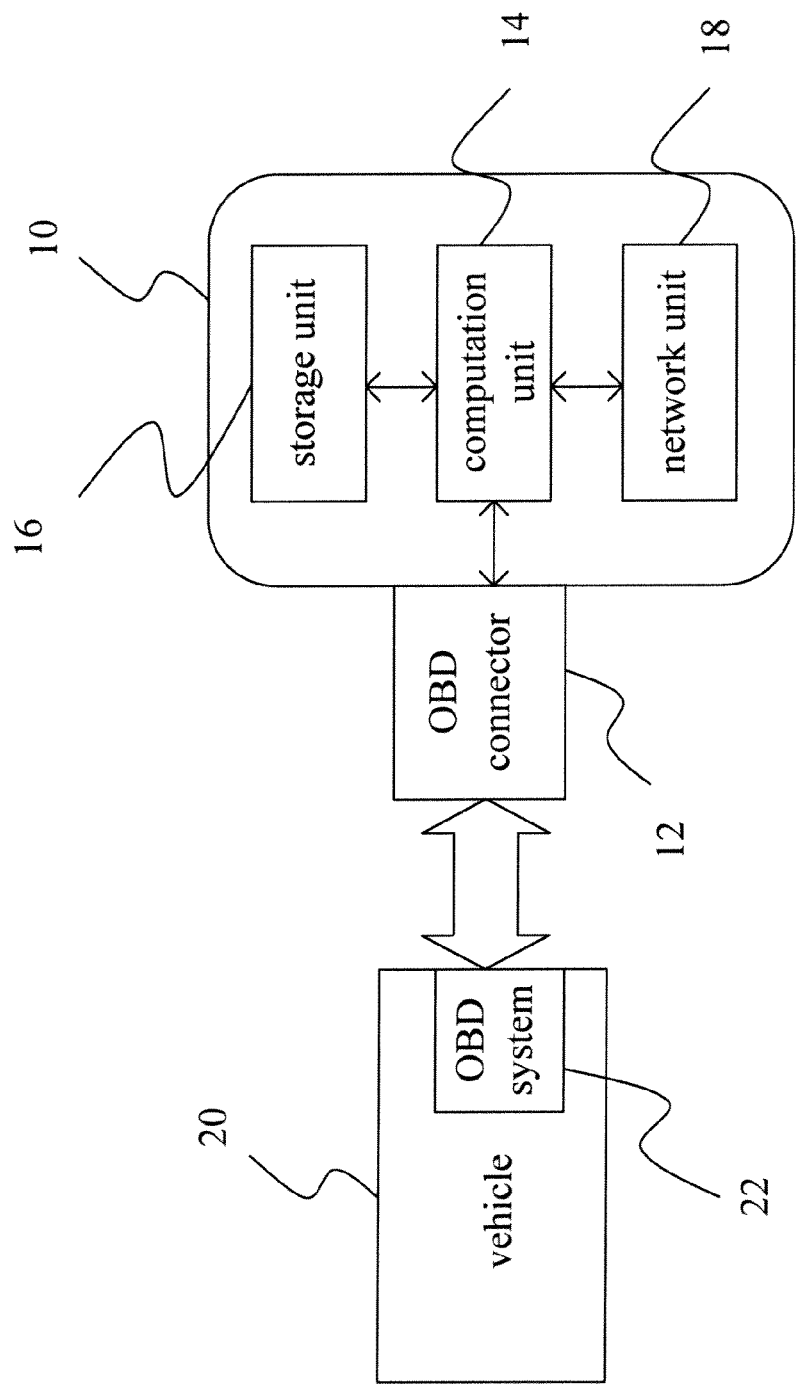
FIG. 1 is a block diagram schematically showing the architecture of a vehicle emission monitoring device according to one embodiment of the present invention.

Refer to FIG. 1 a block diagram schematically showing the architecture of a vehicle emission monitoring device according to one embodiment of the present invention. The vehicle emission monitoring device 10 of the present invention comprises an OBD connector 12, a computation unit 14, a storage unit 16 and a network unit 18. The OBD connector 12 connects with an OBD system 22 of a vehicle 20 to receive information of OBD instantaneous fuel consumption of the vehicle 20. The computation unit 14 may be a CPU (Central Processing Unit). The computation unit 14 electrically connects with the OBD connector 12, storage unit 16 and network unit 18 and controls the activities thereof. The computation unit 14 works out carbon dioxide emission of the vehicle 20 according to the OBD-OBS fuel consumption relationship and the OBS fuel consumption-carbon dioxide emission relationship, which are stored in the storage unit 16. The network unit 18 is electrically connected with the computation unit 14 and controlled by the computation unit 14 to transmit or receive wireless signals.

Figure 2:
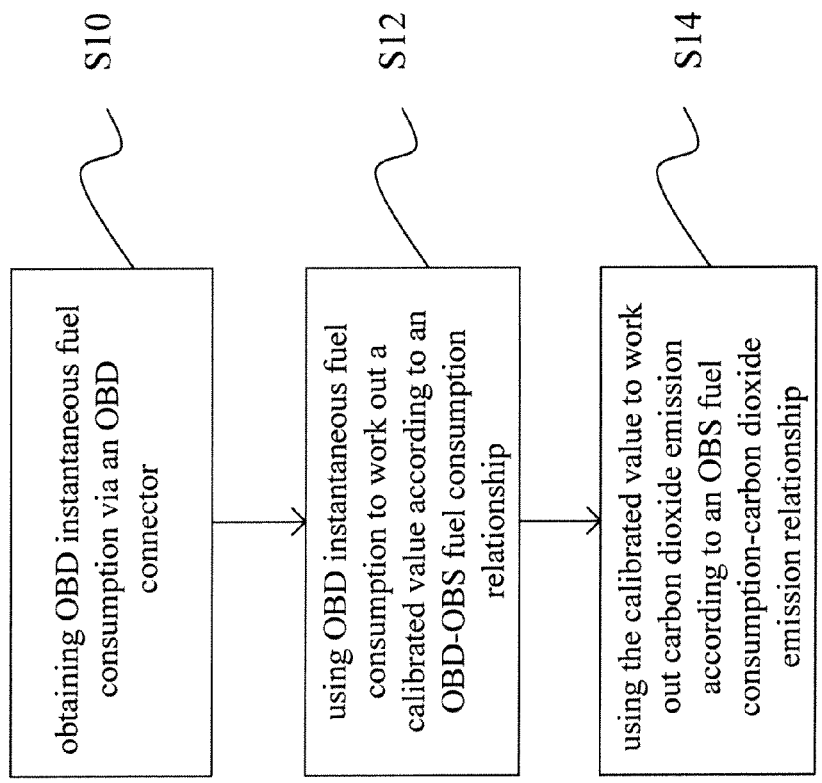
FIG. 2 shows a flowchart of a vehicle emission monitoring method according to one embodiment of the present invention.

Refer to FIG. 2 a flowchart of a vehicle emission monitoring method according to one embodiment of the present invention. In Step Sb, connect the OBD connector 12 (an SAEJ1962 connector) with the OBD system 22 to receive OBD instantaneous fuel consumption detected by the OBD system 22, and store the OBD instantaneous fuel consumption into the storage unit 16. In Step S12, the computation unit 14 reads the OBD instantaneous fuel consumption and the OBD-OBS fuel consumption relationship from the storage unit 16 to work out a calibrated value. The OBD-OBS fuel consumption relationship is expressed by Equation (1):

$$Y_{OBS\_fuel}(x_{OBD\_fuel}) = Z \quad (1)$$

wherein $Y_{OBS\_fuel}$ is a fuel consumption detected by the OBS system, $x_{OBD\_fuel}$ a fuel consumption detected by the OBD system, Z a constant (a mathematic function to a power of 1, 2, - - - , N). In Step S14, the computation unit 14 uses the calibrated value to work out carbon dioxide emission according to the OBS fuel consumption-carbon dioxide emission relationship stored in the storage unit 16 and expressed by Equation (2):

$$Fuel_{CB}(t) = \frac{R_{CWFHC} \times HC_{MASS}(t) + \frac{M_C}{M_{CO}} \times CO_{MASS}(t) + \frac{M_C}{M_{CO2}} \times CO_{2MASS}(t)}{R_{CWF}} \quad (2)$$

wherein $Fuel_{CB}(t)$ is a fuel consumption rate (g/s), $R_{CWF}$ a carbon equilibrium of fuel, $R_{CWFHC}$ an average weight of carbon equilibrium of hydrocarbon in waste gas, $HC_{MASS}(t)$ an instantaneous weight of hydrocarbon (g/s), $CO_{MASS}(t)$ an instantaneous weight of carbon monoxide (g/s), $CO_{2\,MASS}(t)$ an instantaneous weight of carbon dioxide (g/s), $M_C$ the molar weight of carbon atoms (g), $M_{CO}$ the molar weight of carbon monoxide (g), and $M_{CO_2}$ the molar weight of carbon dioxide (g).

Figure 3:
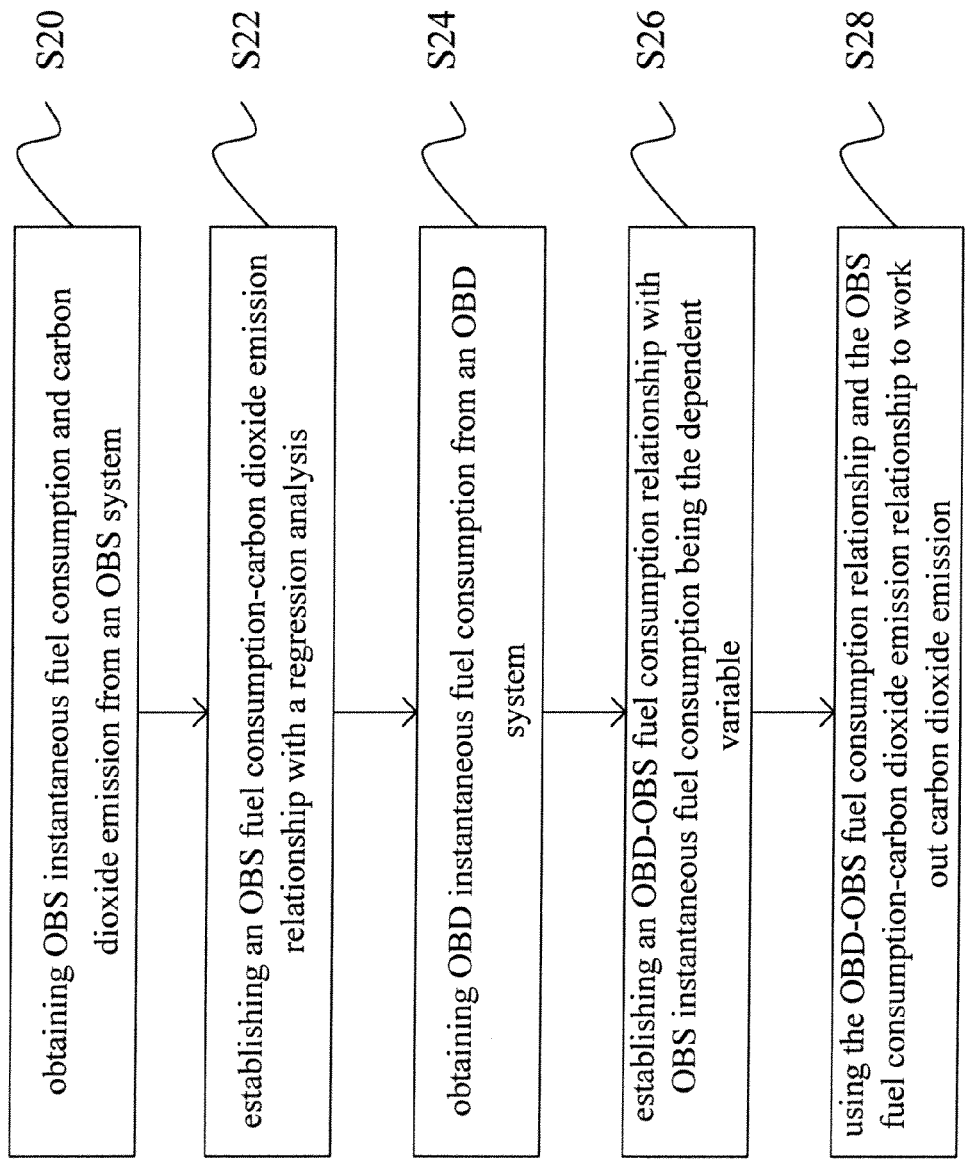
FIG. 3 shows a flowchart of obtaining an OBS fuel consumption-carbon dioxide emission relationship and an OBD-OBS fuel consumption relationship according to one embodiment of the present invention.
Figure 4:
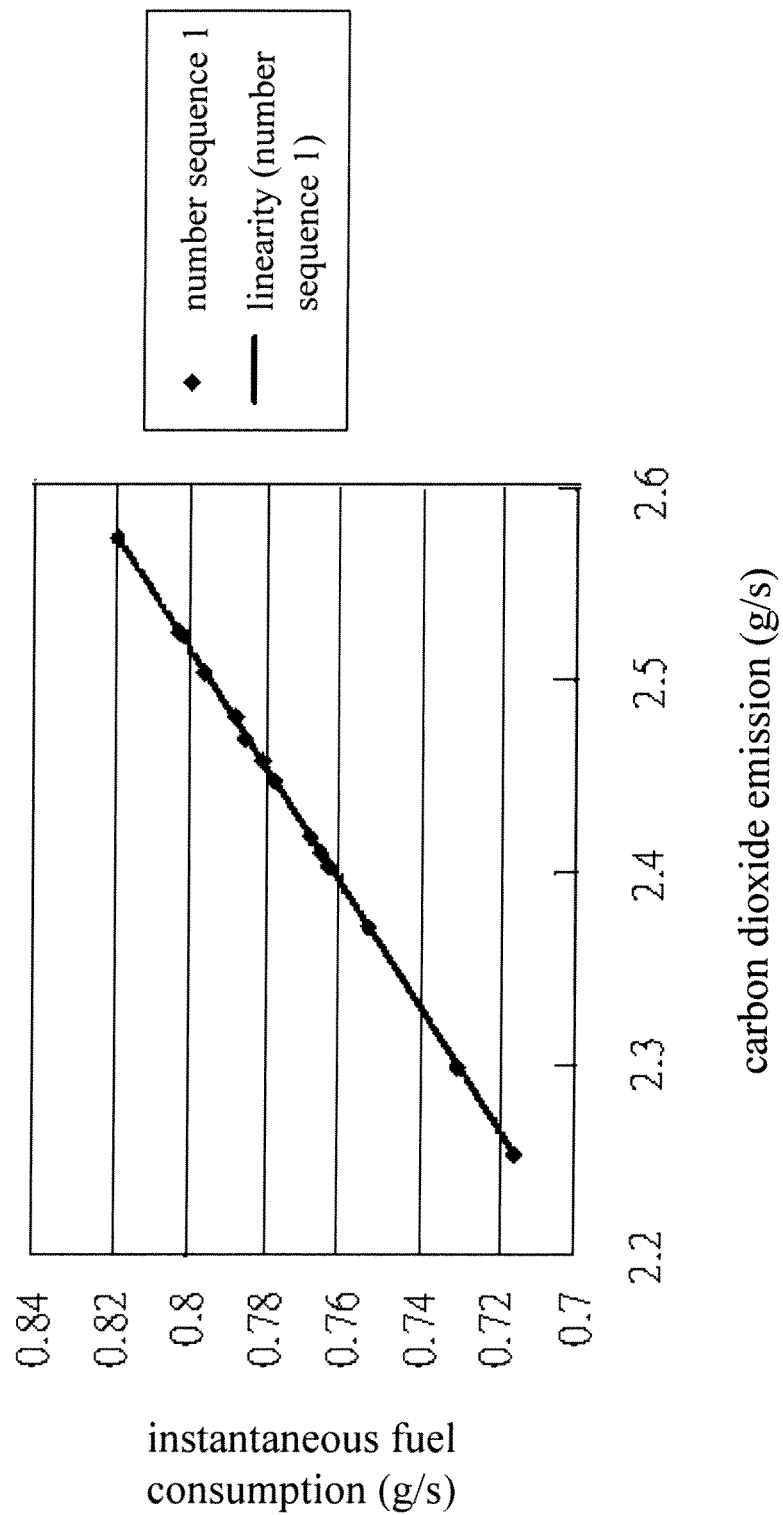
FIG. 4 is a diagram showing an OBS instantaneous fuel consumption-carbon dioxide emission relationship according to one embodiment of the present invention.
Figure 5:
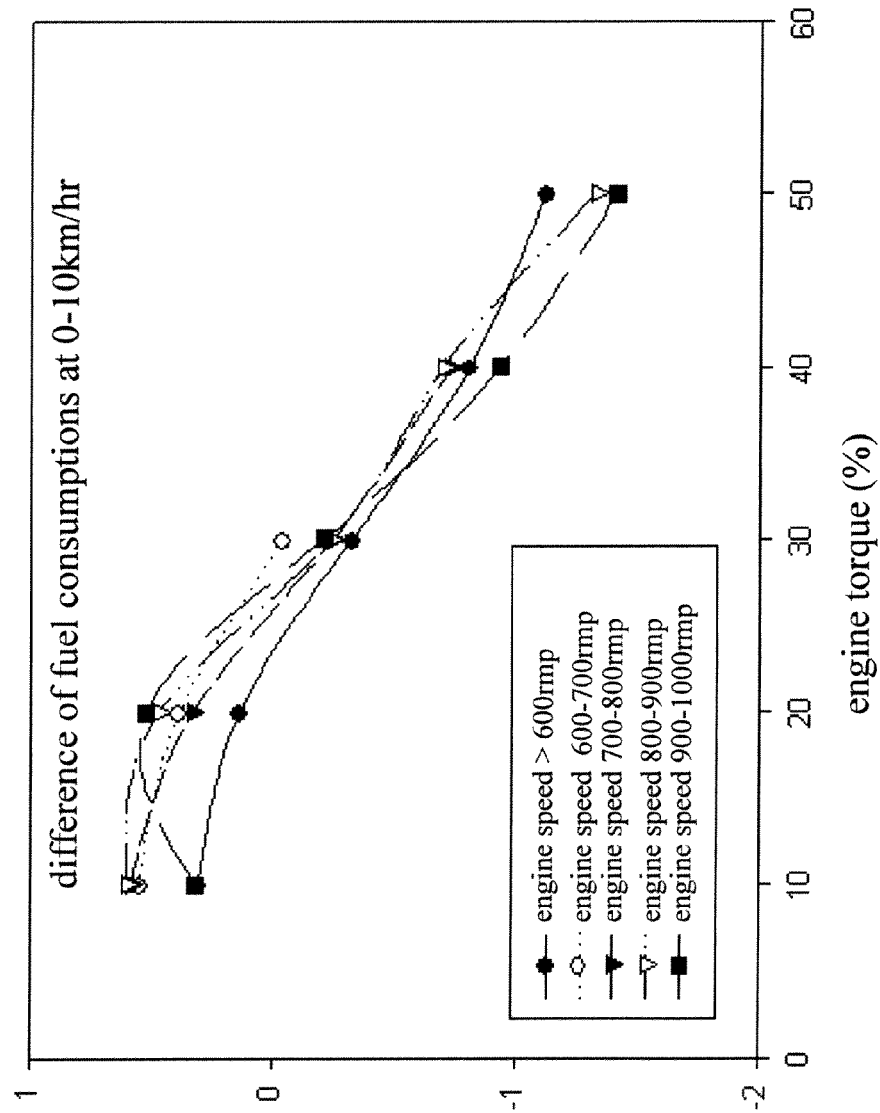
FIG. 5 is a diagram showing a relationship of engine torque and difference of OBS instantaneous fuel consumption and OBD instantaneous fuel consumption according to one embodiment of the present invention.
Figure 6:
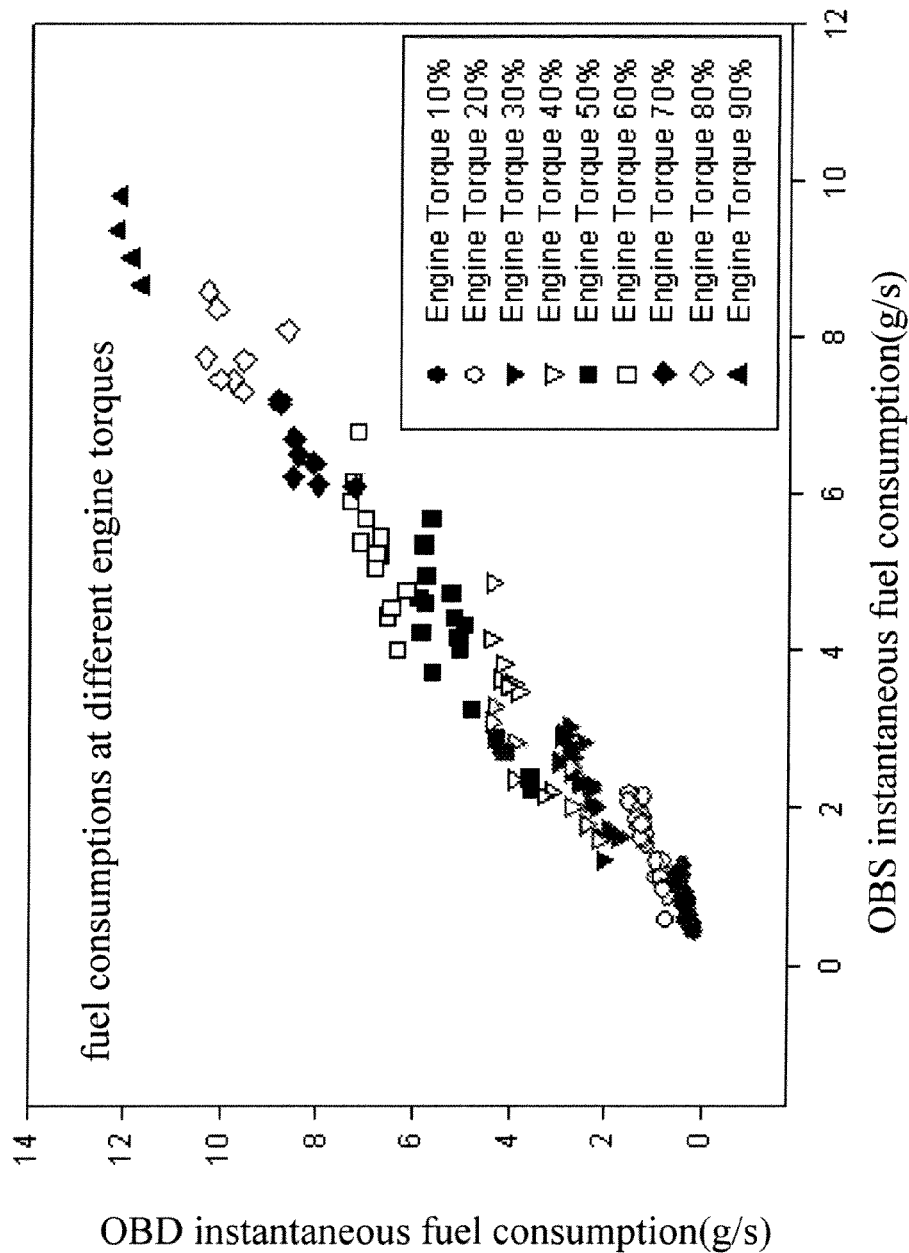
FIG. 6 is a diagram showing a relationship of OBS instantaneous fuel consumption and OBD instantaneous fuel consumption at different engine torques according to one embodiment of the present invention.

The vehicle emission device of the present invention can works out carbon dioxide emission via only using an OBD system. The OBD-OBS fuel consumption relationship and the OBS fuel consumption-carbon dioxide emission relationship are obtained according to the flowchart shown in FIG. 3. In Step S20, the OBS system is used to obtain OBS instantaneous fuel consumption and carbon dioxide emission. Next, in Step S22, an OBS fuel consumption-carbon dioxide emission relationship is obtained with a regression analysis. Refer to FIG. 4 for an OBS instantaneous fuel consumption-carbon dioxide emission relationship, which can be expressed by Equation (3):

$$y = 0.3177x - 2E-05 \quad (3)$$

wherein x is carbon dioxide emission (g/s), and y OBS instantaneous fuel consumption (g/s). Next, in Step S24, obtain OBD instantaneous fuel consumption. Next, in Step S26, obtain difference of OBS instantaneous fuel consumption and OBD instantaneous fuel consumption, and obtain OBS instantaneous fuel consumption and OBD instantaneous fuel consumption occurring at an identical condition. Refer to FIG. 5 a diagram showing the relationship of engine torque and difference of OBS instantaneous fuel consumption and OBD instantaneous fuel consumption. From FIG. 5, it is known that engine torque is a critical factor for instantaneous fuel consumption. Then, a regression method is used to draw the distribution of OBS instantaneous fuel consumption and OBD instantaneous fuel consumption. FIG. 6 shows the relationship of OBS instantaneous fuel consumption and OBD instantaneous fuel consumption under different engine torques. From FIG. 6, it is known: Under different torques, OBS instantaneous fuel consumption and OBD instantaneous fuel consumption have different relationships expressed by different equations.

When engine torque is at 0-10%, OBD-OBS fuel consumption relationship is expressed by Equation (4):

$$y = -22.081x^3 + 19.914x^2 - 3.3432x + 0.6113 \quad (4)$$

When engine torque is at 10-20%, the OBD-OBS fuel consumption relationship is expressed by Equation (5):

$$y = 1.2133x^3 - 4.8212x^2 + 7.6662x - 2.6006 \quad (5)$$

When engine torque is at 20-30%, the OBD-OBS fuel consumption relationship is expressed by Equation (6):

$$y = -2.6209x^3 + 18.622x^2 - 42.157x + 32.39 \quad (6)$$

When engine torque is at 30-40%, the OBD-OBS fuel consumption relationship is expressed by Equation (7):

$$y = 0.3059x^3 - 2.7413x^2 + 8.7483x - 7.5707 \quad (7)$$

When engine torque is at 40-50%, the OBD-OBS fuel consumption relationship is expressed by Equation (8):

$$y = -0.6574x^3 + 9.2721x^2 - 41.689x + 62.921 \quad (8)$$

When engine torque is at 50-60%, the OBD-OBS fuel consumption relationship is expressed by Equation (9):

$$y = -5.2747x3 + 107.78x2 - 731.1x + 1651.4 \quad (9)$$

When engine torque is at 60-70%, the OBD-OBS fuel consumption relationship is expressed by Equation (10):

$$y = 1.1732x^3 - 27.683x^2 + 217.61x - 563.56 \quad (10)$$

When engine torque is at 70-80%, the OBD-OBS fuel consumption relationship is expressed by Equation (11):

$$y = -0.6158x^3 + 18.592x^2 - 186.07x + 625.14 \quad (11)$$

When engine torque is at 80-90%, the OBD-OBS fuel consumption relationship is expressed by Equation (12):

$$y = -102.09x^3 + 3646.2x^2 - 43399x + 172169 \quad (12)$$

In the abovementioned equations, x denotes OBD instantaneous fuel consumption (g/s), and y denotes OBS instantaneous fuel consumption (g/s). Then, in Step S28, use OBD instantaneous fuel consumption to obtain carbon dioxide emission according to the relationships stored in hardware.

The device of the present invention is easy to install and operate. The device and method of the present invention apply to any vehicle having an OBD system. The present invention not only instantly works out carbon dioxide emission but also reduces cost of detecting carbon dioxide emission.

The embodiments described above are only to exemplify the present invention but not to limit the scope of the present invention. Any equivalent modification or variation according to the spirit or characteristic of the present invention is to be also included within the scope of the present invention.

What is claimed is:

1. A vehicle emission monitoring device including instantaneous fuel consumption data and carbon dioxide emission data pre-stored in a memory device thereof from a non-dispersive infrared analyzer on-board emission measurement system (OBS), said vehicle emission monitoring device, comprising:
    an on-board diagnostic (OBD) connector connecting with an OBD system to receive an OBD instantaneous fuel consumption of said vehicle; and
    a processor electrically connecting with said OBD connector and said memory device to receive information of vehicle statuses, said processor configured to:
        determine: (1) an OBS-OBD fuel consumption relationship; and, (2) an OBS fuel consumption-carbon dioxide emission relationship from said instantaneous fuel consumption data and said carbon dioxide emission data pre-stored in said memory device from the OBS, said OBS-OBD fuel consumption relationship being determined by defining a distinct set of non-overlapping torque ranges and establishing a corresponding set of distinct equations assigned respectively thereto relating said instantaneous fuel consumption from the OBS to said OBD instantaneous fuel consumption per each corresponding non-overlapping torque range;
        store said OBS-OBD fuel consumption relationship and said OBS fuel consumption-carbon dioxide emission relationship in said memory device;
        obtain an OBD instantaneous fuel consumption;
        selectively determine a calibrated value of said OBD instantaneous fuel consumption based on said OBS-OBD fuel consumption relationship; and
        determine a carbon dioxide emission of said calibrated value as a function of an OBS-OBD fuel consumption-carbon dioxide emission relationship while decoupled from the on-board emission measurement system (OBS).

2. The vehicle emission monitoring device according to claim 1, wherein said fuel consumption relationship is expressed by $$Y_{OBS\_fuel}(x_{OBD\_fuel}) = Z$$

wherein $Y_{OBS\_fuel}$ is a fuel consumption detected by an on-board emission measurement system (OBS), $x_{OBD\_fuel}$ a fuel consumption detected by said OBD system, and Z a constant.

3. The vehicle emission monitoring device according to claim 1, wherein said fuel consumption-carbon dioxide emission relationship is expressed by $$Fuel_{CB}(t) = \frac{R_{CWFHC} \times HC_{MASS}(t) + \frac{M_C}{M_{CO}} \times CO_{MASS}(t) + \frac{M_C}{M_{CO2}} \times CO_{2MASS}(t)}{R_{CWF}}$$

wherein $Fuel_{CB}(t)$ is a fuel consumption rate (g/s), $R_{CWF}$ a carbon equilibrium of fuel, $R_{CWFHC}$ an average weight of carbon equilibrium of hydrocarbon in waste gas, $HC_{MASS}(t)$ an instantaneous weight of hydrocarbon (g/s), $CO_{MASS}(t)$ an instantaneous weight of carbon monoxide (g/s), $CO_{2\ MASS}(t)$ an instantaneous weight of carbon dioxide (g/s), $M_C$ molar weight of carbon atoms (g), $M_{CO}$ molar weight of carbon monoxide (g), and $M_{CO_2}$ molar weight of carbon dioxide (g).

4. The vehicle emission monitoring device according to claim 1 further comprising a wireless communication unit electrically connecting with said processor to receive or transmit wireless signals.

5. A vehicle emission monitoring method comprising steps:
    using a non-dispersive infrared analyzer on-board emission measurement system (OBS) device to obtain instantaneous fuel consumption data and carbon dioxide emission data from said vehicle;
    storing the instantaneous fuel consumption data and carbon dioxide emission data in a memory device;
    maintaining the memory device operatively decoupled from the OBS device;
    using a processor to determine an OBS fuel consumption-carbon dioxide emission relationship based upon the carbon dioxide emission data with a statistical method or a regression method;
    obtaining an OBD instantaneous fuel consumption data from an on-board diagnostic (OBD) system;
    establishing an OBS-OBD fuel consumption relationship with said OBD instantaneous fuel consumption data being an independent variable and said OBS instantaneous fuel consumption data being a dependent variable, said OBS-OBD fuel consumption relationship being determined by defining a distinct set of non-overlapping torque ranges and establishing a corresponding set of distinct equations assigned respectively thereto relating said OBS fuel consumption to said OBD fuel consumption per each corresponding non-overlapping torque range; and
    converting said OBD instantaneous fuel consumption data into carbon dioxide emission data according to said OBS-OBD fuel consumption relationship and said OBS fuel consumption-carbon dioxide emission relationship while decoupled from the on-board emission measurement system (OBS).

6. The vehicle emission monitoring method according to claim 5, wherein establishing said OBS-OBD fuel consumption relationship further comprising steps:
    selecting said OBS instantaneous fuel consumption data and said OBD instantaneous fuel consumption data occurring under substantially identical conditions from a database of said OBS system and said OBD system to obtain statistical values thereof;
    using said statistical values to draw a distribution diagram of said OBS instantaneous fuel consumption data and said OBD instantaneous fuel consumption data according to a statistical method or a regression method; and obtaining said OBS-OBD fuel consumption relationship from said distribution diagram.

7. The vehicle emission monitoring method according to claim 5, wherein said OBS fuel consumption-carbon dioxide emission relationship is expressed by $$Fuel_{CB}(t) = \frac{R_{CWFHC} \times HC_{MASS}(t) + \frac{M_C}{M_{CO}} \times CO_{MASS}(t) + \frac{M_C}{M_{CO2}} \times CO_{2MASS}(t)}{R_{CWF}}$$

wherein $Fuel_{CB}(t)$ is a fuel consumption rate (g/s), $R_{CWF}$ a carbon equilibrium of fuel, $R_{CWFHC}$ an average weight of carbon equilibrium of hydrocarbon in waste gas, $HC_{MASS}(t)$ an instantaneous weight of hydrocarbon (g/s), $CO_{MASS}(t)$ an instantaneous weight of carbon monoxide (g/s), $CO_{2\ MASS}(t)$ an instantaneous weight of carbon dioxide (g/s), $M_C$ molar weight of carbon atoms (g), $M_{CO}$ molar weight of carbon monoxide (g), and $M_{CO_2}$ molar weight of carbon dioxide (g).

8. The vehicle emission monitoring method according to claim 5, wherein said OBS-OBD fuel consumption relationship is expressed by $Y_{OBS\_fuel}(x_{OBD\_fuel})=Z$ wherein $Y_{OBS\_fuel}$ is a fuel consumption detected by said OBS, $x_{OBD\_fuel}$ a fuel consumption detected by said OBD system, and Z a constant.

9. The vehicle emission monitoring device according to claim 1, wherein said OBS fuel consumption-carbon dioxide emission relationship is expressed by: y=0.3177x−2E−05, wherein x is carbon dioxide emission (g/s), and y is OBS instantaneous fuel consumption (g/s).

10. The vehicle emission monitoring method according to claim 5, wherein said OBS fuel consumption-carbon dioxide emission relationship is expressed by: y=0.3177x−2E−05, wherein x is carbon dioxide emission (g/s), and y is OBS instantaneous fuel consumption (g/s).

* * * * *